United States Patent
Gonzalez Merino et al.

(10) Patent No.: US 7,699,387 B2
(45) Date of Patent: Apr. 20, 2010

(54) SHADING DEVICE FOR VEHICLE ROOFS WITH TRANSPARENT ELEMENT

(75) Inventors: Ricardo Gonzalez Merino, Burgos (ES); Ricardo Iglesias Sedano, Burgos (ES); Cesar Marcos Gonzalez, Burgos (ES)

(73) Assignee: Grupo Antolin-Ingenieria, S.A. (ES)

( * ) Notice: Subject to any disclaimer, the term of this patent is extended or adjusted under 35 U.S.C. 154(b) by 425 days.

(21) Appl. No.: 11/737,524

(22) Filed: Apr. 19, 2007

(65) Prior Publication Data

US 2007/0262618 A1 Nov. 15, 2007

(30) Foreign Application Priority Data

May 19, 2006 (ES) ................................ 200601296

(51) Int. Cl.
*B60J 1/20* (2006.01)
(52) U.S. Cl. .................. 296/214; 296/224; 160/281; 160/288
(58) Field of Classification Search ............. 296/214, 296/224; 160/269, 281, 286, 288, 290.1
See application file for complete search history.

(56) References Cited

U.S. PATENT DOCUMENTS

| | | | | |
|---|---|---|---|---|
| 529,179 A * | 11/1894 | Lidback | ...................... | 160/281 |
| 536,168 A * | 3/1895 | Burrowes | .................... | 160/281 |
| 2,187,242 A * | 1/1940 | Kesner | .................... | 160/172 R |
| 7,156,143 B2 * | 1/2007 | Katada et al. | ............... | 160/288 |
| 2007/0125506 A1* | 6/2007 | Eiselt et al. | ............ | 160/370.22 |

* cited by examiner

*Primary Examiner*—Dennis H Pedder
(74) *Attorney, Agent, or Firm*—Banner & Witcoff, Ltd.

(57) ABSTRACT

The present invention consists of a concealment device for vehicle roofs with a transparent element comprising a group of technical solutions in the blocking means which enable unblocking and smooth opening and closing movements without losing efficiency in respect of retention. It is characterized by the use in the rail of an elastomeric body with a distortion capacity such that when the braking brake shoe attempts to advance a front of elastomeric material forms in front and a traction zone forms behind, checking the advance. The device also incorporates blocking means which make use of an appropriately configured lever which multiplies the release force of the retention brake shoes applied by means of a wire or similar, by power obtained from the handle device.

20 Claims, 9 Drawing Sheets

SHADING DEVICE FOR VEHICLE ROOFS WITH TRANSPARENT ELEMENT

OBJECT OF THE INVENTION

The present invention consists of a device for concealing vehicle roofs with a transparent element comprising a number of technical solutions in the blocking means which enable unblocking and smooth opening and closing movements of the sunblind without any loss of effectiveness in terms of retention.

The technical solutions adopted are mainly incorporated in the area of braking against the rail in such a way so that the use of an elastomeric component on which the brake shoe fits creates a distortion with a front of material which establishes the blocking or retention.

Other technical solutions adopted affect both the means of retracting the blocking brake shoe and the activation of the handle device.

The blocking means are characterised by the use of an appropriately configured lever which multiplies the release force of the retention brake shoes applied by means of a wire or similar by power obtained from the handle device.

The handle device is characterized by its symmetrical conduct so that both the opening and closing of the sunblind, the force of the thrust applied to the handle device of the sunblind serve both to achieve the displacement of said sunblind and to release the blocking mechanisms. This technical solution avoids a dual gesture: one of release and another of displacement; both are thus reduced to a single movement consistent with the application the force of the thrust on the handle device.

BACKGROUND TO THE INVENTION

The presence of transparent elements in vehicle roofs has given rise to the design of sunblinds adapted to the configuration of the area to be covered.

This type of device depends largely on the area and its configuration both in terms of form and aspect of the perimeter edge and its curvature. The availability of a technical solution with a given configuration does not guarantee the viability of an application to a greater area or one with different curvature as a simple scaling for example, can give rise to components with inertias which exceed the admissible values for the means of retention or guiding.

Modifying the guiding means is not always possible by scaling since its location in the vehicle roof imposes severe spatial restrictions because, for example, the height of the device reduces habitability in the interior of the vehicle.

As a result, changing the dimensions of the transparent element to be covered in the majority of cases requires a change in the solutions applied to each of the parts of the shading device.

Returning to the blocking means, the use of increasingly large transparent elements gives rise to sunblinds which, due to their greater dimensions, also show greater inertial effects.

These inertial effects are important both in the braking and acceleration of the vehicle since the sunblind is impelled and is displaced longitudinally according to the vehicle's direction. This undue displacement does not occur if the blocking means are able to provide sufficient retention.

Sufficient retention is achieved with brake shoes which apply the necessary pressure to ensure that the frictional or interlocking forces used are able to balance the inertial forces.

This pressure force is usually carried out by springs which can be used as chocks. The release of these springs is achieved by applying greater force from the handle device. When this force is high, the manual action of the sunblind becomes difficult or even impossible for users with little strength.

The patents with publication numbers EP1201473 and EP1353037 make use of cables or traction bars which act directly on the pressure spring of the retention brake shoes. The release of the blocking means is achieved by direct traction from the handle device. It is possible that the handle device is provided with some means of increasing the tension either because it causes a control to rotate with a different curvature radius in the cable winding from that at the point of application of the force, or either another medium situated in the central point of the handle device.

The drawings in the patent with publication number DE10338722 shows a support point which is almost precisely between the brake shoe and the sunblind guide.

The drawings show that this brake shoe is withdrawn by means of a cable with a cover which enables the brake shoe to be retracted directly overcoming the resistance offered by the pressure spring against the guide.

In all the cases known the brake shoe support is exercised on the elastomeric material with a retention based on a retention force which principally verifies being proportional to the friction coefficient and the applied force; or it either establishes the retention by incorporation of teeth which improve the braking force.

The present invention proposes the use of an elastomeric component with properties in respect of distortion which give rise to a different form of retention as well as the incorporation of means for multiplying force situated in the point of application of the blocking combined with a handle device with symmetrical conduct in order to make the unblocking of the sunblind more effective, thus facilitating operation.

DESCRIPTION OF THE INVENTION

The shading device of this invention is designed to cover extensive transparent vehicle surfaces. The extensive area of these transparent surfaces gives rise to the fact that the sunblind is of a dimension which has important inertial effects. The technical solution adopted in this invention ensures that the user is not aware of the forces brought into play by the means of retention as the force applied on the handle device is small and this reduced force exercised with a single gesture serves to release the sunblind and to displace it.

In order to achieve this technical objective, the shading device of the invention makes use of a combined solution by: using an elastomeric component with a high capacity for distortion, the means of activating the blocking and the means of activating the handle device.

The blocking means are located in at least one of the ends of the sunblind.

In the event of using reinforcing elements, the blocking means are preferably located in the reinforcement element placed in the intermediate area of the sunblind, so that by means of the brake shoes they exercise pressure against the guide.

It is in this guide that the essential component of the invention is situated comprising an elastomeric body with a high distortion capacity. The capacity for distortion of this elastomeric body could also be increased due to the fact that it is hollow.

The high distortion capacity is what will permit the braking mode since that distortion capacity will enable the formation of a front of material against the brake shoe action; however, the incorporation of an elastomeric element means that the hollow cavity favours distortion as required.

The brake shoe acts by locking onto the elastomeric body in such a way that the support surface inclines approximately in the direction of the nucleus of this body if it is solid, or in the direction of the cavity if it is hollow. It is the conduct of the elastomeric body which enables the entry of the brake shoe given its capacity for admitting considerable distortions.

The force of the brake share in the direction of the guide forces a second distortion which drags material in its displacement following interlocking. In the direction of the advance of the brake shoe, material accumulates in the frontal face according to that same advance direction, so that in addition to the friction of the lateral face of the brake shoe, retention is obtained due to support against this accumulated material.

There is also a traction on the elastomeric body behind with respect to the advance direction.

This brake shoe advance is produced solely along a distance sufficient to create these distortions in the area of the support zone of the brake shoe, the front part with the accumulation front and the back traction area; and it does not progress any further given that the retention produced detains the advance.

In the preferred example, due to its simplicity use will be made of a hollow tubular elastomeric body with circular section.

However, despite these resources which aim to increase retention, additional solutions are incorporated which improve the blocking capacity. The force of the brake shoe is due to a spring action which provides sufficient force against the surface on which it is supported. Increasing the spring force presupposes increasing to the same degree the application force of the brake shoe. This force has a limit which is that of the admissible force for a user attempting to release the blocking means. When the user releases the blocking means it is necessary to provide a force which exceeds that offered by the spring and if it is unable to exceed that force the user will be unable to move the sunblind.

When striations are used in the elastomeric body thus increasing retention due to the increased friction, if this is the case it may also occur that the force applied by the user enables the blocking means to be applied without totally exceeding the spring force. In these circumstances there is still contact of the brake shoe with the striation, and the user, by thrusting the sunblind causes an intermittent friction which gives rise to an unpleasant "machine gun" type noise which, in addition, causes considerable wear.

In the event that the spring has a high load in order to exercise a considerable force on the brake shoe, some force demultiplication means have been provided so that its release will be total, and will only require the application of a small effort on the part of the user.

The brake shoes are preferably configured according to a brake shoe-slider device such that a sliding slider shoe is provided which is solely responsible for its function and adjacent to this the blocking brake shoe. The group is housed in a single resistant casing. Since they are adjacent the brake shoe is able to pressurise the rail with the appropriate orientation despite the fact that it has a certain curvature.

With respect to the second curvature corresponding to the degree of divergence, it is preferable for the reinforcement element and its blocking means to be situated outside that curvature. However, the adoption of adequate measures to adapt to the divergence in the brake shoe-slider group does not affect the invention which is based on the combination of the means of demultiplication and the technical solution of the handle device.

The preferred embodiment of the means of demultiplication of the force applied by the user of the handle device consists of a lever with three relevant points for activation:

a first point of support in the body of the brake shoe-slider group consistent with an axle around which the lever rotates, a second point situated in the opposite extreme where the force of traction is exercised by means of a wire or similar, originating from the operation control impelled by the user.

a third intermediate support point defined by means of a slot, that is, a groove into which a stub which is solid to the brake shoe such that the rotation of the lever retracts the brake shoe when the wire is pulled from the control; and it thrusts the brake shoe when, having been released, the spring acts.

This slot enables the turning of the lever to exercise a force on the stub solid to the brake shoe according to its projection, that of the force, in the direction of retraction or displacement of the brake shoe. The slot transforms a movement of rotation of the lever in a linear displacement movement in the direction of retraction of the brake shoe.

The quotient of the distance between the point of support of the slot and the lever support point, that which corresponds to its centre of rotation and the distance between the end point of the operating lever of the force and also the support point mentioned is the coefficient of de-multiplication of the force multiplied by the cosine of the angle of projection in the direction of displacement of the brake shoe; said de-multiplication coefficient is inversely proportional to the force required in the traction of the wire, or similar to exceed the force of the spring.

The traction wire reaches the handle device which is the part directly handled by the user. This handle device is such that the user both in forward and backward direction of the sunblind only presses a projection which serves as a handle. Its performance is symmetrical, that is, this sole thrusting force simultaneously totally releases the blocking means and impels the sunblind.

In addition, the direction of application of the force always coincides with the direction of displacement of the sunblind. Part of the force is used to release the blocking means and reaches a limit once released, then the second part of the force serves to move the sunblind.

The preferred means of operation is with a support in the form of a casing which houses the actuator essentially comprising a plate. This plate can be displaced backwards and forwards guided by its support.

This plate includes a handle which facilitates thrusting.

In the case of using blocking means on both sides of the sunblind, this plate has two grooves which essentially coincide with a centred transversal reference line, considering transversal to be the direction perpendicular to the displacement of the sunblind.

The operating wire which emerges on one or the other side of the handle device also reaches wither of the blocking means, those which are in opposition on the sides of the sunblind or the reinforcement element on which they are installed. Therefore, the two branches of the wire arrive or leave the handle device passing inside without necessarily interrupting it.

The wire passes through the grooves in such a way that on pressing the actuator in the form of a plate forwards or backwards, the wire is also displaced with the actuator. As the wire enters by a central point of the support casing, this displacement forwards or backwards forces the wire feed from outside the control and this occurs because the wire entrance is always in a direction perpendicular to that of the actuator movement and, therefore, of the sunblind.

The result is that, when pressing the actuator forwards or backwards the wire is retracted. That is, the blocking means are always released by traction.

In corroboration of the conduct described, the fact that the blocking means are provided with a demultiplication of the force makes the first thrusting action invest in releasing the blocking means because it is already a sufficient force to obtain this, and subsequently the thrust is maintained and used to displace the sunblind.

The handle device has elements for recovery from the central balance position in the absence of thrusting forces.

Therefore, it is possible to establish as essential characteristics of the shading device for vehicle roofs with a transparent element the fact that it comprises a laminar body (1.1) which establishes the barrier to light which passes through the transparent element of the roof guided laterally by means of rails (2), and is provided with blocking means (1.2) at least on one side of said laminar body, or a sunblind (1); and also a handle device (1.3) for release and dragging of the sunblind (1) when the retention is established by interlocking of the brake shoe (1.2.2) into a hollow elastomeric body (2.1).

The hollow elastomeric body (2.1) is such that in the case of the attempt at advancement by the shading device, a distortion is produced which gives rise to the accumulation of elastomeric material in the frontal zone (2.1.1.) and traction in the back zone (2.1.2) in order to prevent said advance.

The multiplication term of the force should be adequately interpreted. When speaking of "multiplication" this is deemed to be the force applied from the handle device in order to overcome the action of the pressure spring on the brake shoe; when speaking of "demultiplication" this is the resistance exercised by the spring on the brake shoe, a resistance which should be overcome by the wire or similar which comes from the operation control. Either terminal, although in opposition, refers to the same effect but simply noted from opposing references: or either from the handle device or either from the spring, the resistance of which should be overcome.

DESCRIPTION OF THE DRAWINGS

The present descriptive report is supplemented by a series of drawings illustrative of a preferred embodiment but not, however, restricting the invention in any way.

DETAILED EXPLANATION OF THE INVENTION

Figure 1:
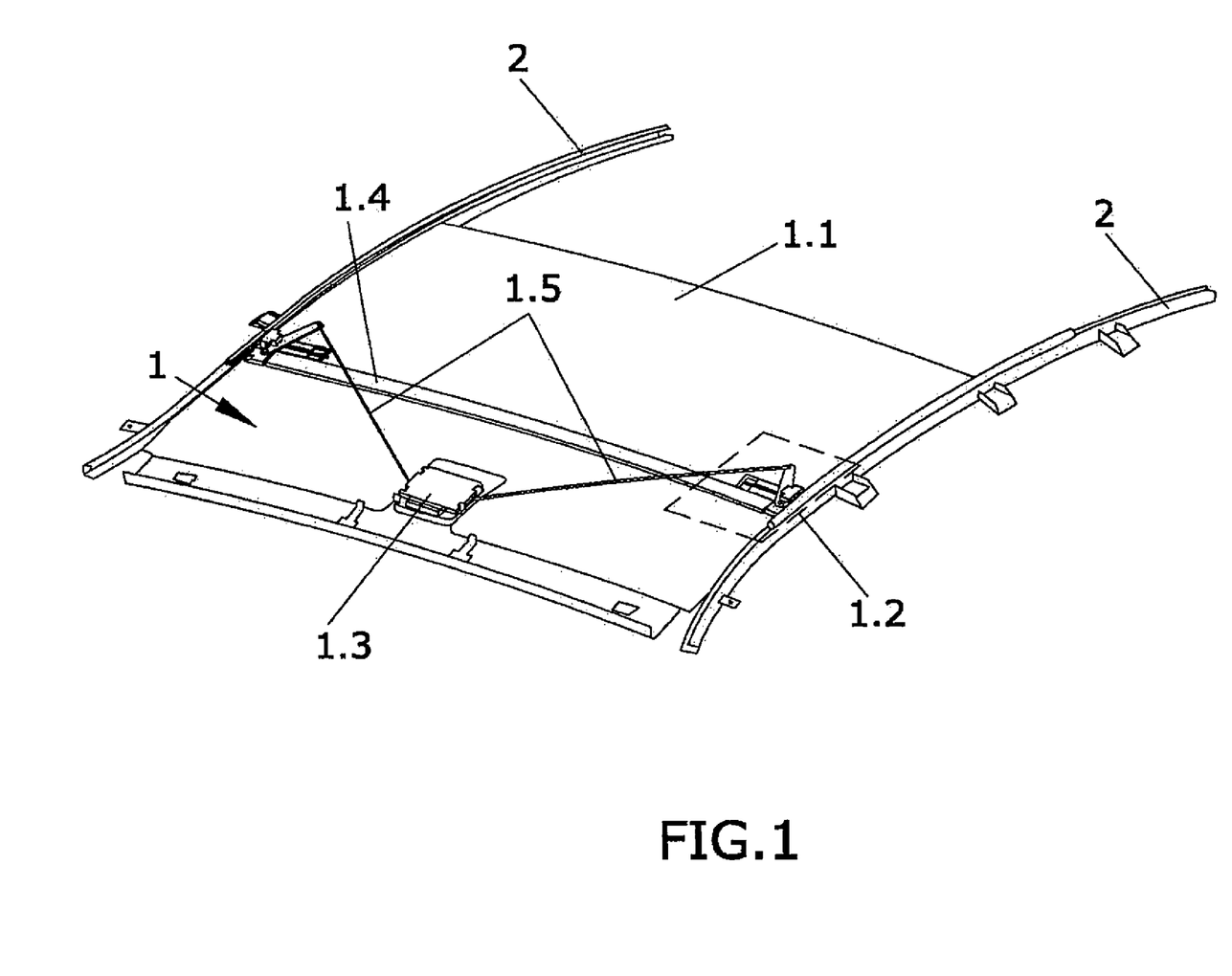
FIG. 1 shows a perspective of a preferred example of the invention which shows the sliding rails of the shading device and the sunblind together with the blocking means and the handle device which corresponds to an important part of this invention.

FIG. 1 shows a perspective view of the invention together with other additional elements which operate with a sunblind (1).

This sunblind (1) runs along the lateral rails (2) which in this example of an embodiment diverge in the front part. In this figure the components associated with the back part have been removed in order to avoid complicating the drawing in the interests of clarity.

In a delayed position with respect to the front edge of the sunblind (1) an intermediate reinforcement element (1.4) is located which is that which in this example of an embodiment is provided with the blocking means (1.2) arranged at either lateral end thereof in order to act on the rail (2).

The situation of this intermediate reinforcement element (1.4) has been chosen at the limit point where the rails (2) diverge in order to avoid incorporating means which adjust to this divergence although nevertheless a sunblind (1) with the essential characteristics which additionally incorporate means of adaptation to the divergence is considered to be within the scope of the invention.

Figure 2:
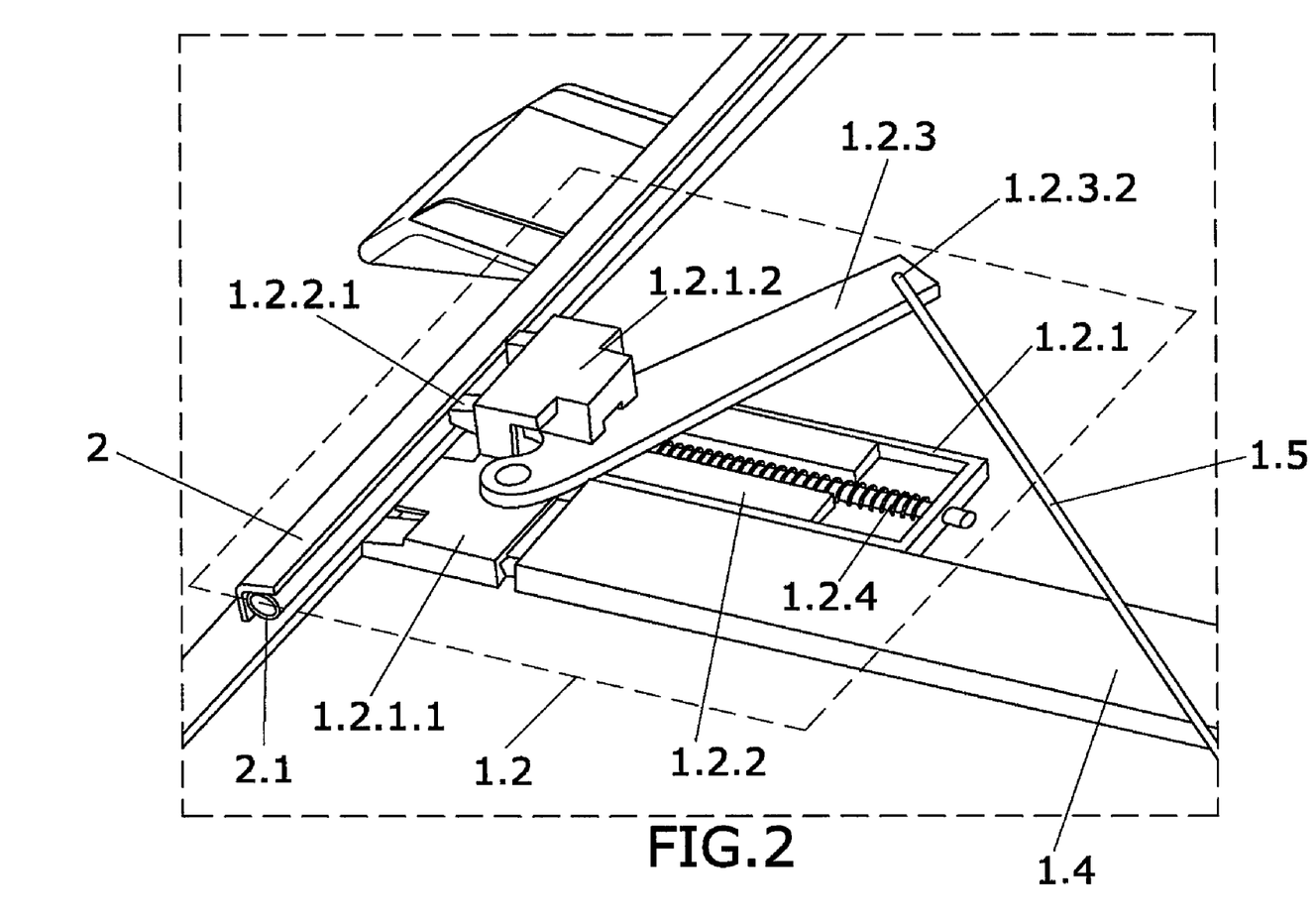
FIG. 2 is a detail of the blocking means of one of the sides in which the parts which intervene in the blocking and retention against the rail are represented.

FIG. 2 is a detail of one of the blocking means (1.2). These blocking means (1.2) as commented are situated at the lateral extremes of the intermediate reinforcement element (1.4). A support body (1.2.1) is attached to the end joining the slider (1.2.1.1) and the brake shoe holder (1.2.1.2); one (1.2.1.1) and the other (1.2.1.2) being situated adjacently.

Figure 7:
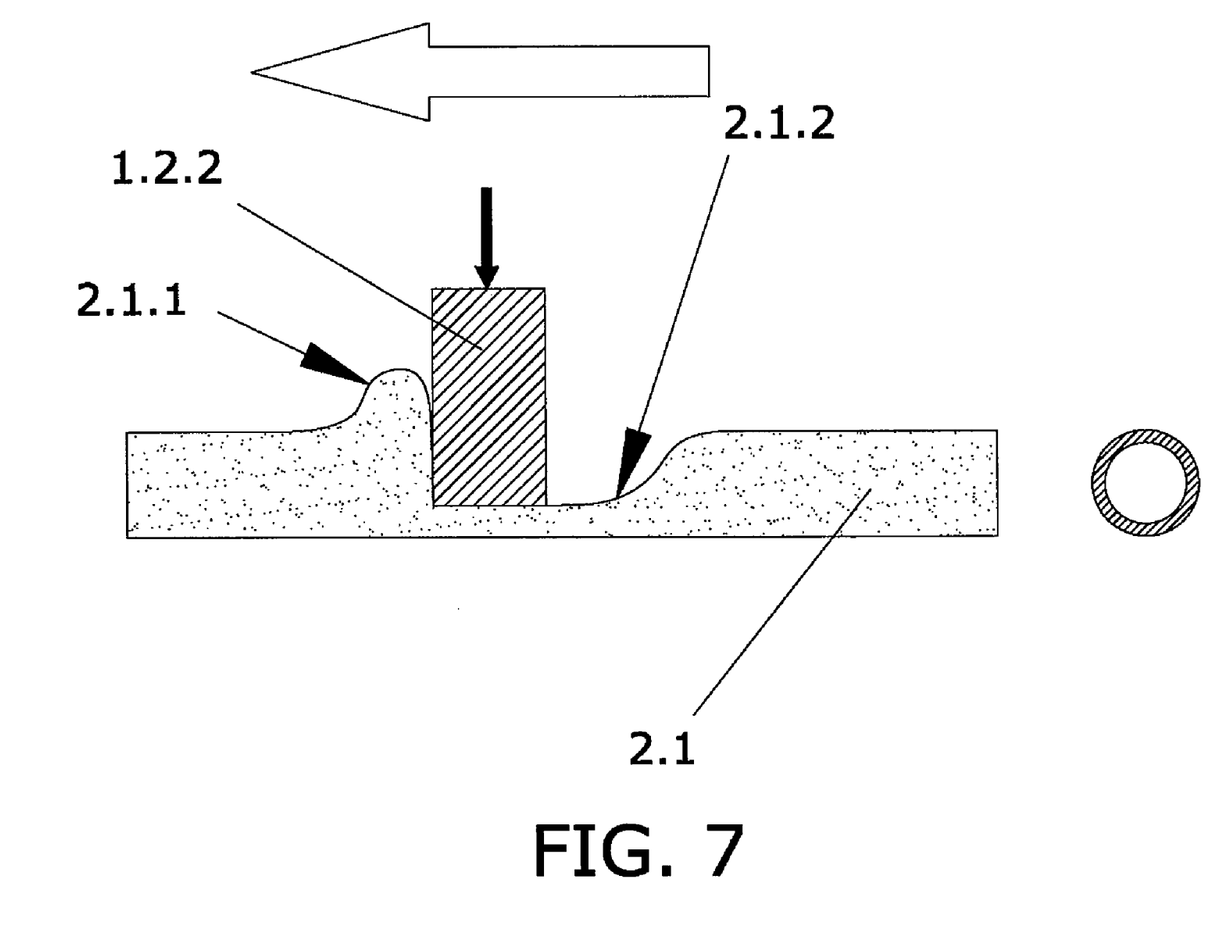
FIG. 7 although situated as the final figure as it illustrates a description of the device following an explanatory order ranging from the largest to the smallest in size, this figure shows a diagram demonstrating the essential nature of the invention which shows the interlocking of the brake shoe and how the retention is produced.

The slider (1.2.1.1) slides along the rail (2), and the brake shoe holder (1.2.1.1) situates two support points of the brake shoe (1.2.2) by the upper part of the rail (2) where, housed in an extension in section with an "L" shape an elastomeric tubular body (2.1) is located. This elastomeric tubular body (2.1) is a means of carrying out the essence of the invention. FIG. 7 shows a diagram of how the distortion of this hollow elastomeric tubular body (2.1) takes place. Nevertheless, this conduct may also be obtained with a sufficiently distortable material which is not hollow.

The large arrow indicates the forward direction of the sunblind on which the retention action is to be exercised. This advance is also that of the brake shoe (1.2.2) in respect of the tubular body (2.1). A small arrow indicates the direction and the force direction exercised by a spring (1.2.4) on the brake shoe (1.2.2) in order to interlock in the tubular body (2.1).

The force of the brake shoe (1.2.2) against the hollow tubular body (2.1) gives rise to a depression in same (2.1) which in this example is favoured due to the fact that it is hollow. The displacement resulting from the advance gives rise to an accumulation of elastomeric material at the front (2.1.1) of the brake shoe (1.2.2) which is compressed; and behind (2.1.2) the elastic is tractioned. The brake (1.2.2) shoe is detained because it comes up against an elastomeric front (2.1.1) which exercises the retention as the elastomere at the back (2.1.2) produces a stretching force through traction, producing a "hook" type effect.

Although this example has made use of a circular section tubular body (2.1) due to its simplicity, it is possible to use other sections albeit solid or hollow, provided that they permit interlocking of the brake shoe (1.2.2) jamming in the manner described.

Figure 2A:
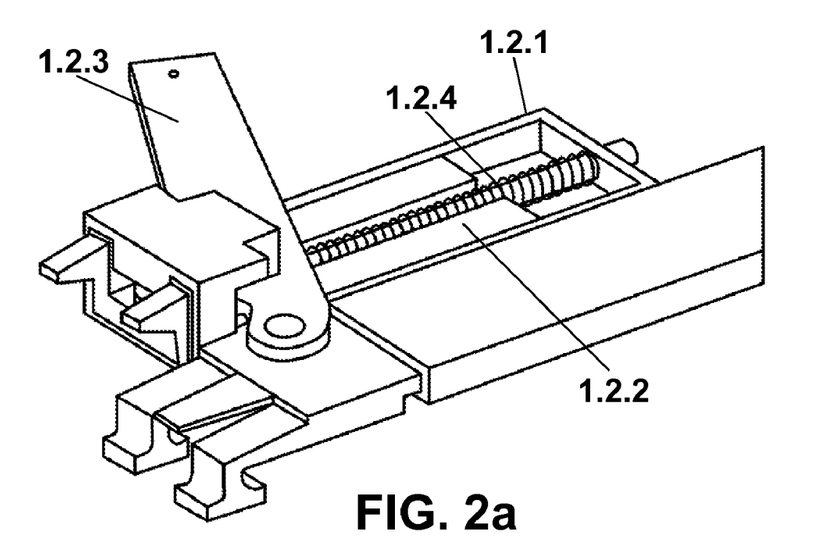
FIGS. 2a and 2b are enlarged views of FIG. 2 with the rail removed for clarity.

The brake shoe (1.2.2) is displaceable transversally to the longitudinal axle of the rail. The pressure of the brake shoe (1.2.2) against the rail (2) is achieved by means of a spring (1.2.4) as referenced in the explanation of the interlocking as can be seen in FIG. 2*a*. As the spring (1.2.4) used in this example is helicoidal and works by compression, it has been guided with an internal rod in order to avoid warping although other means exist for stabilizing the spring without this modifying the invention in any way.

Figure 2B:
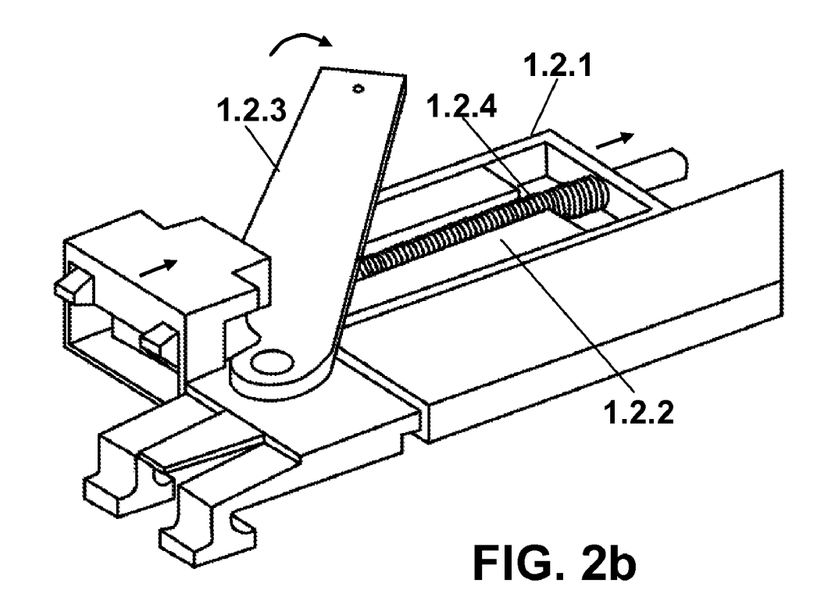

If there were no element to oppose the force exercised by this spring (1.2.4), the brake (1.2.2) shoe would be permanently acting against the rail (2) in the blocking position. The release which enables displacement of the sunblind (1) is carried out by means of a lever (1.2.3) activated by the tension traction of a wire (1.5) as it is represented in FIG. 2*b*.

Figure 3:
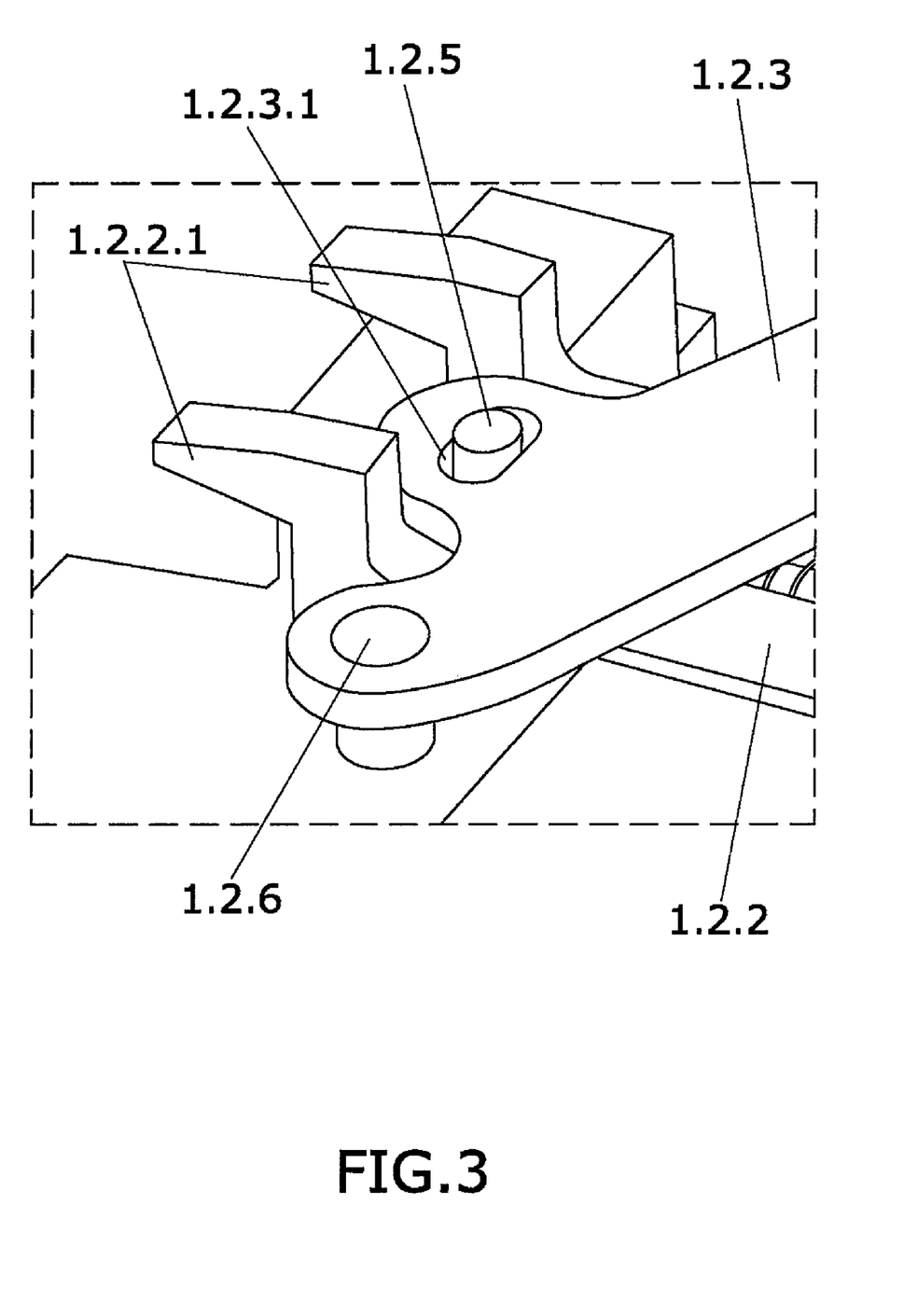
FIG. 3 is a detail of these same means in which the upper part of the casing has been removed in order to visualise the de-multiplication lever of the spring resistance.

FIG. 3 is a detail of these same means (1.2) of blocking in which the upper part of the casing of the brake shoe (1.2.12) holder has been removed in order to visualise the working of the internal components.

The base of the lever (1.2.3) is exposed to show the axle (1.2.6.) of support in order to permit the rotation of a slot (1.2.3.1) according to a groove which is essentially transversal to the direction of the brake shoe's movement (1.2.2). The rotation of the lever (1.2.3) may be broken at the point where the brake (1.2.2) shoe rests on the slot (1.2.3.1) by means of a pin (1.2.5) in two: a component of movement in the direction of the displacement of the brake (1.2.2) shoe and a transversal component. Only the longitudinal component intervenes, carrying out the work, and the transversal displacement component simply enables movement to transform the rotation into a linear displacement.

The third point of interest of the lever (1.2.3) is that of the external end of the rotation, which comprises a perforation (1.2.3.2) which holds the traction wire (1.5).

This point with the perforation (1.2.3.2) is where the traction takes place.

In FIG. 3 two "L" shaped sections (1.2.2.1) are noted which are responsible for support in the elastomeric tubular body (2.1). This is the means of establishing in this example the brake shoe (1.2.2) support against the rail (2).

The traction wire (1.5) is the means of transferring the force exercised on the handle (1.3) device to the (1.2) blocking means for release.

This handle (1.3) device has a symmetric conduct and functions in the same way in the case of thrusting its handle (1.3.2.1.) or grip forwards or backwards. The thrust in an initial direction provides the force which, multiplied by the lever (1.2.3) releases the (1.2) blocking means and, without any additional manoeuvre but still maintaining the thrust, the displacement of the sunblind (1) is achieved.

The handle (1.3) device in this example of an embodiment on the laminar body (1.1) which establishes a barrier against the light passing through the transparent roof element.

Figure 4:
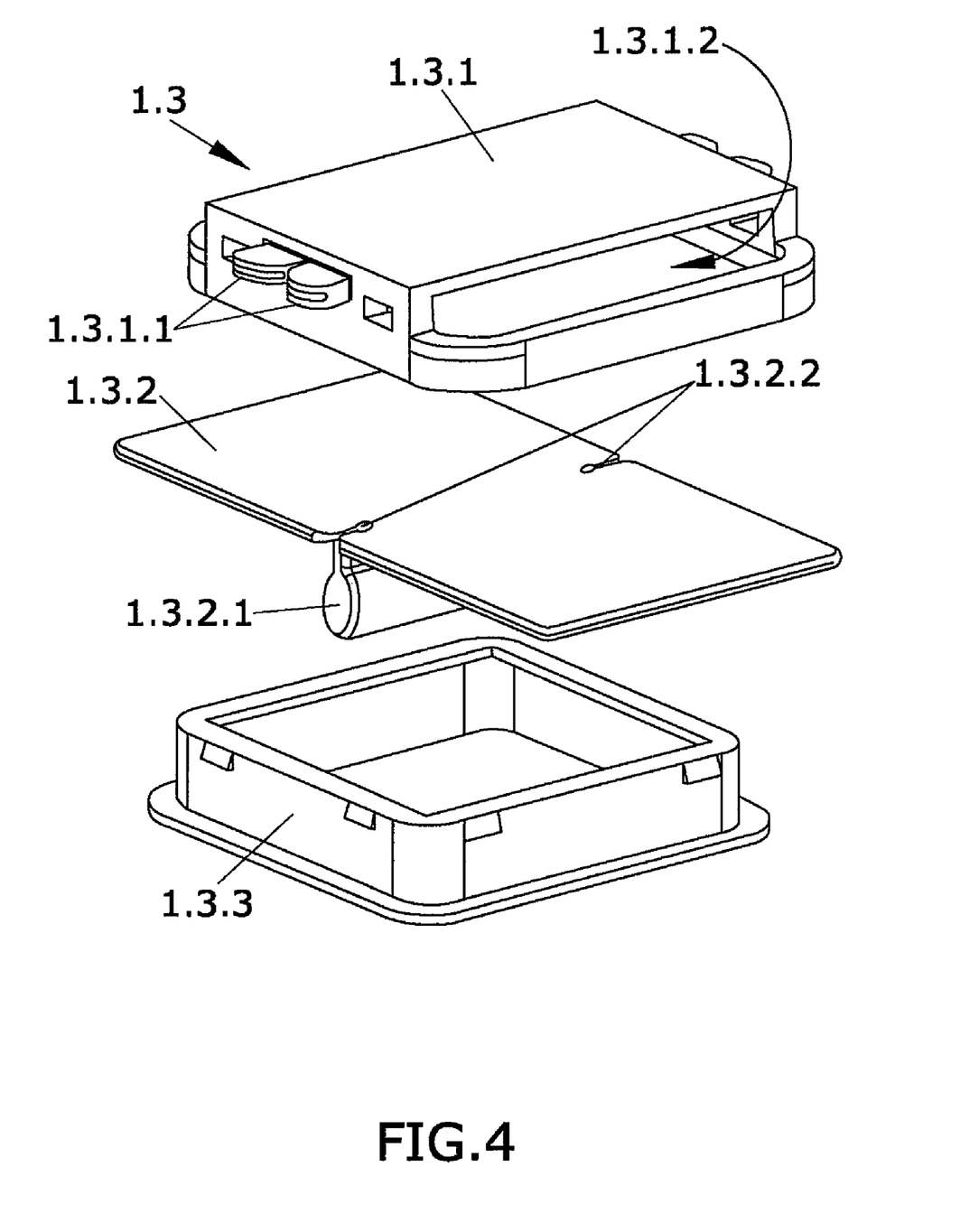
FIG. 4 shows an opened up perspective of a first example of the handle device.

The handle (1.3.2.1) in a first example of embodiment is integrated with the plate which comprises the actuator (1.3.2). This plate slides on the support (1.3.1) either backwards or forwards, the movement being permitted by the presence of two windows (1.3.1.2). When the actuator plate (1.3.2) is displaced and passes out of one of the windows (1.3.1.2) it should be ensured that on the other side the other window should not be opened up. This condition is achieved by defining the length of the actuator plate (1.3.2) sufficiently extensively such that the window (1.3.1.2) is not left free.

A trim (1.3.3) is situated under the actuator (1.3.2) which in this example is fixed by means of a clip to the support (1.3.1).

The actuator (1.3.2) is provided with a hole (1.3.2.2) on either side or a groove for passing and holding the wire (1.5) by exercising force on the handle (1.3.2.1) the wire (1.5) is pulled and emerges from either side simultaneously in order to act on the blocking means (1.2) of the sunblind (1).

The outlet of the wire (1.5) of the handle (1.3) device is situated in the centre of the sides through pulleys (1.3.1.1) or redirectors. In the actuator (1.3.2) displacement the displaced distance is approximately the distance between the fixed pulleys (1.3.1.1) and the holes (1.3.2.2) or grooves of the same actuator (1.3.2) and this distance coincides with the displacement of the wire (1.5) in order to exercise the traction. These distances vary depending on the configuration of the pulleys (1.3.1.1) without modifying the mode of operation.

Figure 5:
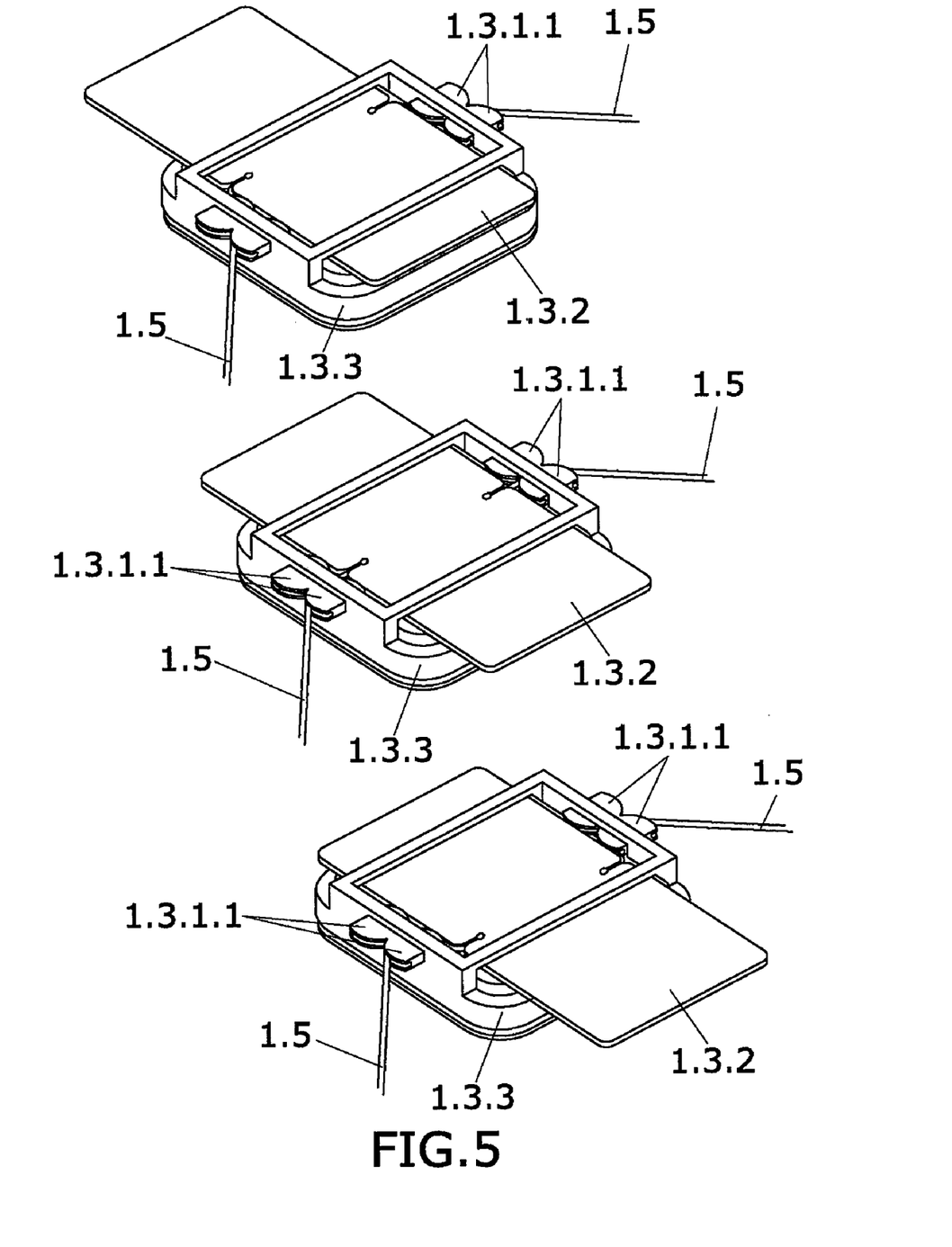
FIG. 5 shows a sequence of three representations of the operating lever according to the previous example in which the three most relevant positions may be noted: unblocking and thrust by opening, in resting position and unblocking and thrust by closure of the sunblind.

FIG. 5 shows three different positions of the activator (1.3.2): forward position, in repose and forward position back showing that in any of the advances, the wire (1.5) traction which gives rise to release of the blocking means (1.2) is the same.

Roof configurations exist with pronounced curvatures which prevent the actuator plate (1.3.2) in the handle (1.3) device from emerging through the windows (1.3.1.2) since they cause mechanical interference.

Figure 6A:
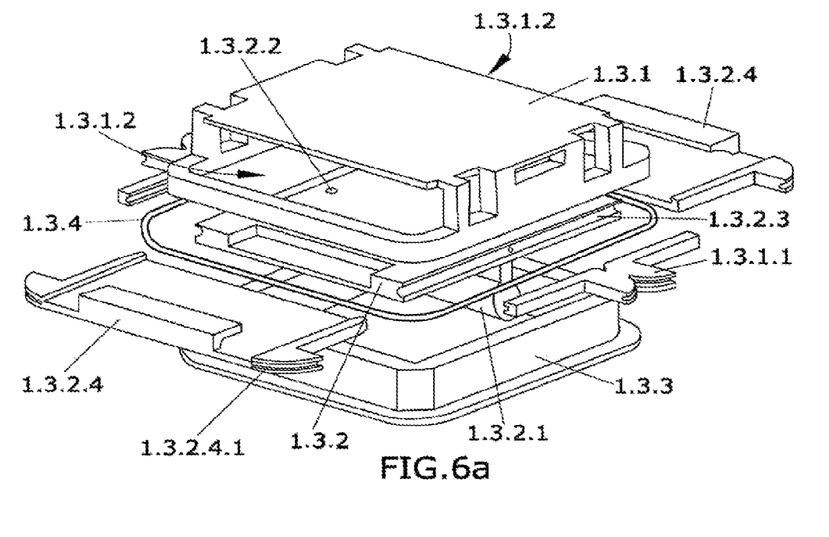
FIG. 6a is an opened up perspective of a second example of embodiment in which the initial design is modified to enable accommodation and free operation in more limited spaces due to the more pronounced curvature of the vehicle roof.

FIG. 6*a* represents an opened out perspective of a second example of carrying out the handle (1.3) device involving covers (1.3.2.4) together with the actuator (1.3.2). The length requirement of the actuator (1.3.2) indicated in the previous example is due to the fact that given an actuator displacement in one direction, it should be ensured that the window (1.3.1.2) provided on the opposite side remains covered.

In this example of an embodiment, this requirement does not exist as the window (1.3.1.2) is covered at all times with the cover (1.3.2.4) situated on this side. However, on the other side where the other cover (1.3.2) is located, it is necessary to ensure that the second cover (1.3.2.4) does not prevent displacement of the actuator (1.3.2). Therefore, each cover (1.3.2.4) may be displaced together with the actuator (1.3.2) so that its movement will not be prevented. In FIG. 6*a* the lateral sliding guides of the wire are shown (1.5). Thus the displacement in one direction of the actuator (1.3.2) causes the cover (1.3.2.4) located on the side of the window (1.3.1.2) to which the actuator (1.3.2) is directed to be displaced with it (1.3.2); and the opposing cover (1.3.2.4) remains in its position covering the opposite window (1.3.1.2).

FIG. 6*a* represents the external corners of the covers (1.3.2.4) which have guides which serve as a neck (1.3.2.4.1) to house the elastic ring (1.3.4) which holds both covers. This elastic ring (1.3.4) tends to constantly approach one cover (1.3.2.4) to the other (1.3.2.4) in such a way that when pressure is removed from the actuator (1.3.2) both the actuator and its covers (1.4.2.4) recover their resting position. The covers (1.3.2.4) come up against the support (1.3.1) or casing so that each cover (1.3.2.4) moves only half the total length of the support (1.3.1) that is, each cover (1.3.2.4) and its resting position only moves outwards from said support (1.3.1).

Figure 6B:
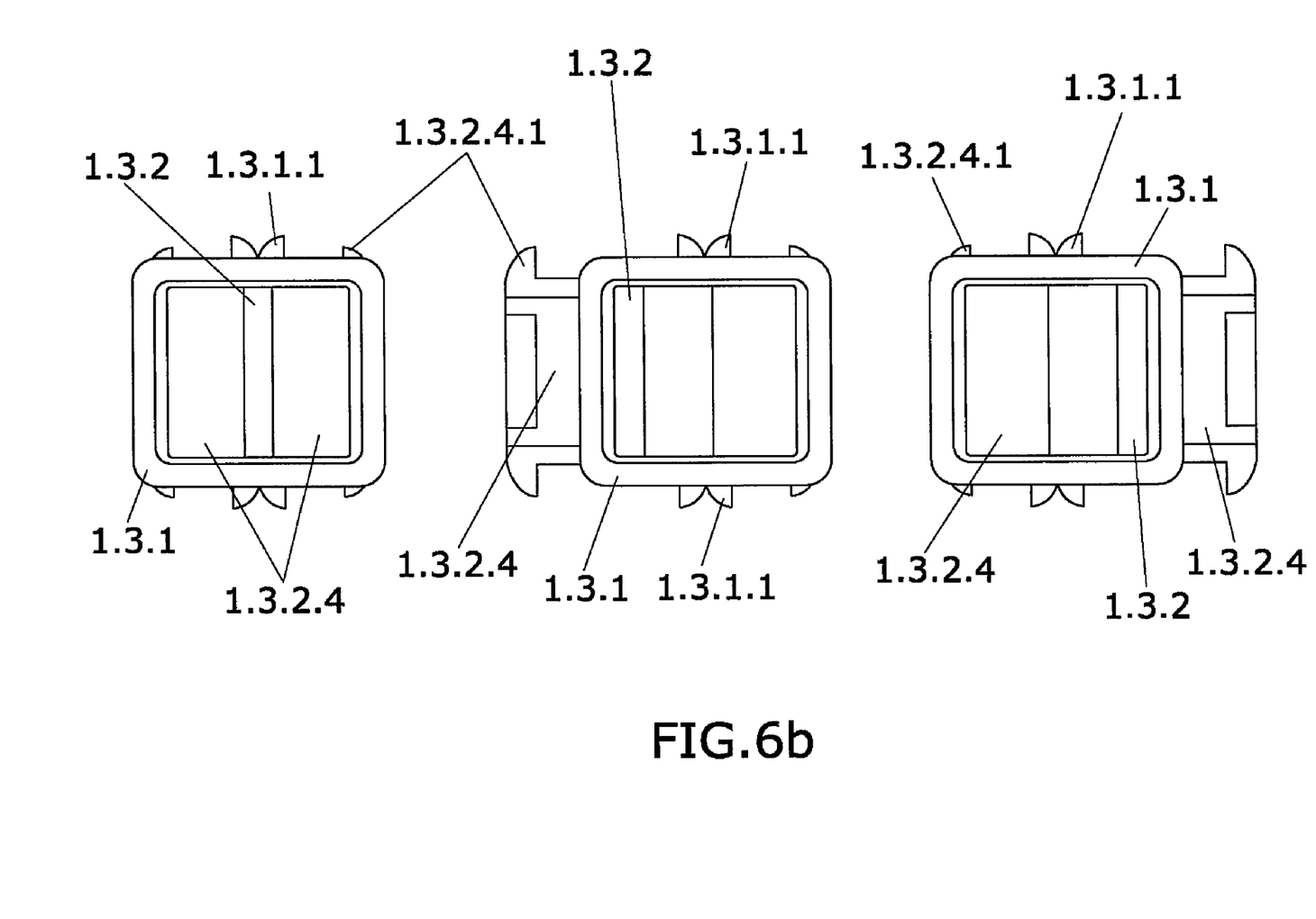
FIG. 6b shows a similar sequence to that illustrated in FIG. 5 with another example of embodiment.

FIG. 6*b* shows a sequence of handle (1.3) device control positions seen from below, from the part viewed by the user, in the following order: resting position, advance in one direction and advance in the opposite direction. It should be stated that in the resting position neither of the covers (1.3.2.4) emerges laterally occupying the minimum space, that which corresponds to the projection of the handle (1.3) device. In the advance position, the cover (1.3.2.4) towards which displacement takes place by thrusting only emerges the displaced distance.

With this means of execution of the handle (1.3) device the space occupied in operating positions is optimised, enabling greater space restrictions for housing and therefore allowing more pronounced roof curvatures.

The invention claimed is:

1. Shading device for vehicle roofs with a transparent element comprising a laminar body which establishes a barrier against the light passing through the transparent element of the roof guided laterally by means of rails, and is provided with blocking means at least on one side of said laminar body; and a handle device for release and dragging of the laminar body wherein retention is established by interlocking of the brake shoe in an elastomeric body such that said elastomeric body has a distortion capacity when attempting to advance the interlocked brake show so that said elastomeric body enables the accumulation of elastomeric material in the front zone and a traction in the back zone.

2. Shading device for roofs of vehicles with a transparent element according to claim 1 wherein the elastomeric body is hollow.

3. Shading device for roofs of vehicles with a transparent element according to claim 2 wherein the hollow elastomeric body is a tubular body in circular section.

4. Shading device for vehicle roofs with a transparent element according to claim 1 wherein the blocking means are controlled by effect of an acting force of the handle for releasing the shading device, said blocking means are provided with means for multiplication of said force deriving from the handle device.

5. Shading device for vehicle roofs with a transparent element according to claim 4 wherein the means for multiplying the force deriving from the handle device includes a lever.

6. Shading device for vehicle roofs with a transparent element according to claim 5 wherein the blocking means includes a body support which includes a slider and a brake show holder arranged adjacently.

7. Shading device for vehicle roofs with a transparent element according to claim 5 wherein the blocking means are provided with a brake shoe pressured by a spring and which is retractable due to a lever which overcomes the resistance of the spring.

8. Shading device for roofs of vehicles with a transparent element according to claim 7 wherein the lever is provided with three points:
 a first point of support in the body of the slider and brake shoe holder group consistent with an axle.
 a second point situated at the opposite end where the traction force is exercised,
 a third intermediate support point defined by means of a groove into which a stub is fitted solid to the brake shoe such that the rotation of the lever retracts the brake shoe when the wire is pulled from the control; and, it thrusts the brake shoe when, having been released, the spring acts.

9. Shading device for vehicle roofs with a transparent element according to claim 7 wherein the brake shoe is configured in such a way that it provides two sections in an "LΔ shape in order to exercise pressure against the rail.

10. Shading device for vehicle roofs with a transparent element according to claim 4 wherein the brake shoe presses against the nucleus of the elastomeric element if it is solid or against the elastomeric tube if said tube is hollow.

11. Shading device for vehicle roofs with a transparent element according to claim 4 wherein the transmission of the release force of the blocking means is carried out by means of a wire or similar.

12. Shading device for vehicle roofs with a transparent element according to claim 4 wherein the handle device has symmetrical conduct in respect of the advance or retreat such that with the force of the thrust it initially causes the blocking means to be released, and maintaining the thrust gives rise to sliding of the sunblind.

13. Shading device for vehicle roofs with a transparent element according to claim 12 wherein the operating lever comprises a support which accommodates an actuator including a plate which slides forwards or backwards and dragging the wire or similar as it moves through the central part such that both when advancing and retracting, the wire or similar is equally tractioned.

14. Shading device for vehicle roofs with a transparent element according to claim 13 wherein the actuator is provided with a handle.

15. Shading device for vehicle roofs with a transparent element according to claim 13 wherein the actuator is provided with a groove or a hole at each side for fixing the wire or similar.

16. Shading device for vehicle roofs with a transparent element according to claim 15 wherein the outlet of the wire or similar is through pulleys or redirectors.

17. Shading device for vehicle roofs with a transparent element according to claim 13 wherein the actuator in its forward or backward movement passes out through the windows present in the support.

18. Shading device for vehicle roofs with a transparent element according to claim 17 wherein the extension of the actuator plate is sufficient at all times to cover the window opposite the side of the outlet in the direction of the displacement.

19. Shading device for vehicle roofs with a transparent element according to claim 17 wherein the handle device is provided with two covers one on each side according to the direction of the displacement of the actuator, where a cover keeps the window covered which would remain free when the actuator is displaced in one direction; and the second is dragged by the actuator itself.

20. Shading device for vehicle roofs with a transparent element according to claim 19 wherein the covers are provided with an elastic recovery ring which passes through necks situated in the external corners thereof.

* * * * *